May 7, 1935.  B. C. PLACE  2,000,147
NONPERFORATED CHANNEL ASSEMBLY
Filed Aug. 7, 1931
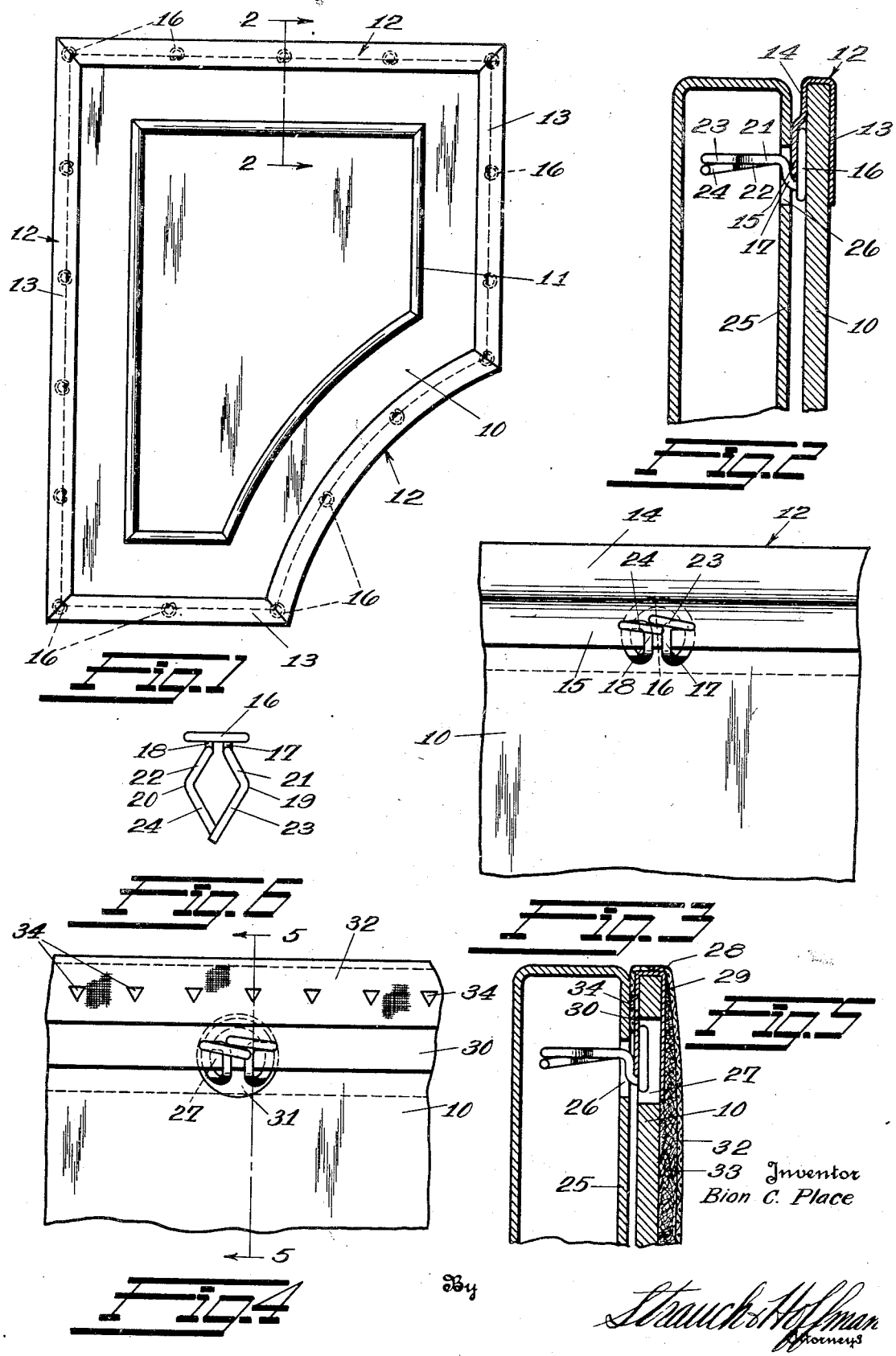
Inventor
Bion C. Place
By
Strauch & Hoffman
Attorneys Patented May 7, 1935

2,000,147

UNITED STATES PATENT OFFICE 2,000,147

NONPERFORATED CHANNEL ASSEMBLY

Bion C. Place, Detroit, Mich., assignor of one-half to George E. Gagnier, Detroit, Mich.

Application August 7, 1931, Serial No. 555,793

2 Claims. (Cl. 45—138)

This invention relates to a trim panel, and a method and arrangement for securing such panel in place upon a suitable supporting structure. More particularly, the invention consist in a metal reinforced trim panel, a method of making such a panel, and an arrangement for securing the panel in place. The invention is particularly intended for application in securing trim panels to the interior of automobile or similar bodies, though it will be understood that it may be put to other uses.

In my application Serial No. 334,548, filed January 23, 1929, now Patent No. 1,889,903, I have disclosed a trim panel in which a metal reinforcement for the edges of a trim panel is utilized as a means for anchoring headed snap or spring fasteners, that are employed to secure the panel in place. With the arrangement there disclosed it is necessary to perforate the reinforcement, and it is essential, that the perforations for the fasteners be properly located with respect to the openings in the supporting structure, and with respect to the openings in the body of the panel, when such are used. Such necessity requires that a large variety of reinforcing strips, having openings variably spaced be provided, in order to meet the varying conditions that are encountered in the application of the said invention.

The primary purpose of the present invention is to provide a method and arrangement whereby a sheet metal reinforcement for an edge of a trim panel or the like may be utilized as a means of attachment of the spring or snap fasteners without requiring perforation of the reinforcement for the purpose of receiving the fastener, to the end that reinforcing strips of precisely the same form may be utilized in any situation in which it is desired to use a metal reinforced panel.

A further object of the invention is to provide a metal reinforced trim panel, the reinforcement of which is unperforated for the reception of fasteners, but in which means are included permitting the assembly of a headed spring fastener with said reinforcement so that the fasteners can be freely assembled with respect to the panels after the panel is otherwise completed.

A still further object of the invention is to provide a metal reinforced trim panel in which the body of the panel is provided with openings for the reception of the heads of the headed spring fastener, and in which the reinforcement is disposed to substantially completely cover said openings in the body on one side of the panel, while the reinforcement only partially covers the openings in the body of the other side of the panel, leaving sufficient space between the reinforcement and edges of the partially covered openings to permit the passage of the heads of the fasteners into said openings.

A still further object of the invention is to provide a metal reinforced trim panel ready for attachment to the supporting structure in which an edge of the metal reinforcement at the rear of the panel is arranged so that snap or spring fasteners may be freely hooked on said edge and adjusted therealong in assembling the panel of this nature to a supporting structure.

Another object of the invention is to provide a metal-reinforced trim panel, one edge of the reinforcement of which is arranged with respect to the panel so that hook-headed fasteners may be relatively freely assembled with respect thereto after the covering of trim material has been applied to the normally exposed face of the panel, and, preferably attached to the reinforcement by means of integral holding elements struck from the reinforcement.

Another object of the invention is to provide an improved method of attaching panels to a supporting structure that includes the hooking of spring fasteners upon the edge of a metal reinforcement for the panel, the adjustment of the fasteners along the edge of the reinforcement to bring them accurately in position, and the assembly of the panel with respect to the supporting structure by insertion of the shanks of the spring fasteners in openings in said structure provided to receive them.

Still another object of the invention is to provide a method of constructing a trim panel, ready for the application of spring fasteners intended to secure the panel to a supporting structure, that consists in the perforation of the body of the panel for the reception of the heads of the fasteners at the points of the body at which the fasteners are to be disposed, the reinforcement of the edges of the panel weakened by said perforations by extending the metal reinforcement so as to completely cover the opening on one side of the panel and to partially cover said opening on the other side, so that the partially uncovered opening on one side of the panel may be utilized to pass the head of the fastener into the opening in the body provided for its reception.

Still further objects of the invention will appear as a description thereof proceeds with reference to the following drawing in which:

Figure 1 is a front view of a panel, including a reinforcement used to anchor spring fasteners, incorporating one embodiment of the present invention.

Figure 2 is a vertical sectional view on an enlarged scale taken on the plane indicated by the line 2—2 in Figure 1.

Figure 3 is a fragmentary rear view of a portion of an edge of the panel illustrated in Figures 1 and 2.

Figure 4 is a fragmentary rear view of a modified form of panel.

Figure 5 is a sectional view taken on the plane indicated by the line 5—5 in Figure 4.

Figure 6 is a view of the preferred form of fastener looking toward the opening in the hook-shaped head thereof.

Like reference characters indicate like parts throughout the several figures.

The improved panel of the present invention consists of a body 10 formed of fibrous or other suitable relatively stiff material. Any suitable fibrous material may be utilized for the body of the panel, said material being stamped out in the form corresponding to the outline of the surface that is to be covered by the completed panel. Said body may be provided with corrugations 11, if desired, to enhance the appearance thereof, or to serve as a riser in the event that trim material is subsequently applied to the body. When so applied, the trim material is preferably sewed to the body on lines following the edges of the corrugations in accordance with known practices. If desired, the corrugation may be omitted. In covered panels, the riser may be a separately applied strip, as may be desired. None of the characteristics of the panel or body just referred to constitute a part of the present invention.

In the embodiment of the invention illustrated in Figures 1, 2 and 3 of the drawing, the entire periphery of the body of the panel is reinforced by means of a metallic binder 12, preferably in the form of a channel having walls 13 and 14 spaced apart sufficiently to snugly receive the edge of the body 10 therebetween. The wall 13 may be relatively short, or it may cover a substantial portion of the front normally exposed face of the body, as illustrated. Said wall may be externally ornamented in any approved manner, as may be the exposed surface of the body 10, if the panel is used without a covering of trim material.

The wall 14 embraces the edge of the panel snugly adjacent the bottom of channel shaped reinforcement 12, and, in order that the hook-headed fastener may be freely assembled with respect to said wall, upper portion 15 thereof is offset and spaced from the inside of the body 10 an amount sufficient to permit the head of the fastener, presently to be referred to, to be freely inserted between the portion 15 and the inside surface of the body. If it is desired to provide the panel just described with a fabric covering, said fabric may be applied so as to completely cover the exposed face of the body and to lap around the edge of the reinforcement, so that the edge of the fabric is disposed in contact with the wall 14 to which it may be secured in any approved manner as by tongues struck from said wall in a manner hereinafter pointed out. The covering of trim material is maintained in this instance, free of the offset portion 15 of the wall 14, so that the hook-headed fasteners can be freely assembled with respect to said offset portion and so that the panel is not spaced from the supporting structure by the further thickness added to the offset portion by any overlapping of the covering material.

Panels constructed as just described can be completed and shipped to the point of installation, when spring or snap fasteners can be assembled thereto with the greatest facility. In constructing the panels, it should be noted that the reinforcement may be constructed from unperforated sheet metal, and that no attention need be paid to the location of fasteners, as is necessary, when fastener-receiving openings are provided in both the body of the panel and the reinforcement, in order that said openings may be properly located with respect to the openings in the supporting structure to which the panel is to be subsequently applied. The characteristic of the present invention whereby ordinary sheet-metal reinforcing strips, that are entirely unperforated may be used, constitutes an important feature of the present invention, since thereby the cost of production of the completed panel is greatly reduced and the labor in applying the panel minimized.

Any spring or snap fastener having a head that is in the form of a hook may be utilized to secure the panel just described in position. The preferred form of fastener, however, is constructed from a single piece of resilient wire by bending the mid-portion of the wire into the form of a loop 16 of any desired outline. The portions of the wire adjacent the ends of the loop 16 are turned inwardly toward the center of the loop providing substantially parallel arms 17 and 18. Said arms are preferably spaced apart as illustrated, and are bent out of the plane of the loop so that a hook is formed between the loop 16 and said arms 17 and 18. The arms 17 and 18 are spaced from the plane of the loop 16 sufficiently so that a snug grip is provided between said arms and the loop and the reinforcement for the panel to which the fastener may be applied. That is, the arms 17 and 18 are spaced from the loop 16 a distance at the point at which the reinforcement is to be gripped slightly less than the thickness of the reinforcement. If desired, said arms may be disposed at a small acute angle to the plane of the loop 16 whereby the fastener can be attached to the reinforcement by causing the reinforcement to enter the wedge-shaped opening in the hook head thus provided.

The ends of the wire from which the preferred fastener is constructed are then turned into planes approximately at right angles to the loop 16, said ends being then bowed outwardly between the loop 16 and the tips thereof, as illustrated at 19 and 20, Figure 6, providing portions 21 and 22 which diverge from each other and portions 23 and 24 that converge towards the end of the shank. The tips of the ends are preferably disposed in modified relation as illustrated.

When it is desired to attach such metal reinforced panels to a supporting structure, a suitable number of spring fasteners, such as just described, are first assembled with respect to the offset portion 15 of the wall 14 of the panel reinforcement. This is accomplished by simply causing said portion to enter the hook formed between the loop 16 and the arms 17 and 18 of each fastener. In this way fasteners are disposed at relatively widely spaced intervals around the entire periphery of the panel as illustrated in Figure 1. The panel is then ready for application to the supporting structure.

In applying the panel to the supporting structure, the panel is brought opposite said structure, and the spring fasteners are properly aligned with the openings formed therein at properly spaced intervals. In the drawing 25 illustrates the wall of a supporting structure, which is provided with a perforation 26, for the reception of the resilient shank of a spring fastener. When the panel is brought opposite the supporting structure, the fastener should be directly opposite the opening 26. If such should not be the case, it will be understood that the fastener may be adjusted along the length of the offset portion 15 by shifting it bodily in a manner that may be readily accomplished by the operator. Having brought the fastener exactly opposite the opening 26, the shank thereof, which consists of the portions 21, 22, 23 and 24, of the fastener, is inserted in said opening by applying pressure to the panel and the fastener assembled with respect thereto, causing the shank thereof to enter said opening. Inasmuch as the diameter of the opening is less than the maximum overall width of the shank of the fastener, the converging guiding portions 23 and 24 of the shank first engage the edges of the opening causing the contraction of the shank. The shank of the fastener may then be passed into the opening, when the divergent holding portions 21 and 22 spring apart, engaging the corners of the opening and serving to firmly draw the panel toward the supporting structure. Each of the fasteners around the periphery of the metal reinforced panel is applied to the supporting structure in the same manner.

If desired, the arrangement illustrated in Figures 4 and 5 may be employed. As illustrated in these figures, the body 10 of the panel is provided with an opening 27 for the reception of the loop of the head of the fastener subsequently applied to the panel at this point. The metal reinforcement 28 in the form of a channel having spaced walls 29 and 30, is applied to the edges of the body. The walls of the channel 29 and 30 are spaced apart sufficiently to snugly receive the edge of the body 10 between them. As illustrated, the wall 29 preferably substantially completely covers the perforation 27 on one side of the body 10. The wall 30, on the other hand, only partially covers said opening 27 on the rear side of the body, leaving a segmental opening 31 that is uncovered by the wall 30.

The panel body reinforced as just described, may be covered by a covering 32 of suitable trim material such as plush, mohair, velvet or the like, said covering being spaced from the body 10 by a suitable wadding 33 following known practices of the art. The fabric covering 32 is lapped around the edges of the body and preferably attached to the reinforcement by means of tongues 34 preferably of triangular shape. Said tongues are formed by slitting the metal constituting them from the wall 30 on two sides of the triangle and by bending the prongs thus formed out of the plane of the wall. After the covering material 32 has been lapped around the reinforcement, the edges thereof are caused to be penetrated by the prongs 34 and said tongues are then bent snugly against the covering material, firmly holding it in position. Said tongues are formed as illustrated in Figure 4, at relatively closely spaced intervals whereby the covering material is held in place snugly at all points around the periphery of the panel.

As illustrated in Figure 4, the covering material terminates substantially short of the edge of the wall 30, maintaining the edge portion of said wall free for the assembly of the hook-headed spring fastener. The panels just described are completed prior to the assembly of the fasteners with respect thereto. When it is desired to apply the trim panel just described to a supporting structure, fasteners are assembled with respect to the wall 30 of the channel shaped reinforcement by causing the loop 16 of the hook-shaped head of the fastener to enter the opening 27 in the panel 10, this being readily brought about by passing the loop member 16 through the segmental opening 31 that is uncovered by the wall 30. The perforations 27 may be made large enough so that the fasteners may be relatively slightly adjusted along the length of the wall 30 so that their shanks may be brought exactly opposite the openings in the supporting structure intended to receive them.

Fasteners of the kind above described are preferred for securing the panel illustrated in Figures 4 and 5 in position, though other types of spring fasteners may be employed. It will be observed that in this form of the invention, the loop 16 of the head is disposed in the perforation 27 so that the panel may be brought snugly against the supporting structure 25 and so that there is no projection of the head of the fastener beyond the outer surface of the body 10. The body 10 of the panel at the point at which it is provided with the perforations 27 is strengthened by the fact that the channel shaped reinforcement 28 completely covers the opening on one side of the panel and partially covers it on the other side thereof, so that said panel in spite of the perforation 27, has a strength at its edge that is at least equal to that secured by an unperforated body of high grade. In constructing the panel, it will be observed that since the reinforcement for the body is unperforated for the insertion of fasteners, it is unnecessary to provide a special reinforcing strip having fastener-receiving openings properly located so as to register with the openings in the body of the panel. If desired, the outer covering 32 and the wadding 33 may be omitted if an uncovered panel is to be applied to the supporting structure.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim as my invention is:

1. A metal reinforced trim panel ready for attachment to a supporting structure, comprising a fibrous body provided with spaced openings adjacent the edges thereof, a metal reinforcement having imperforate margins for the edges of said body partially covering the openings in said body, and hook-headed spring fasteners hooked on one of the margins of the reinforcement so that the heads thereof are disposed in said openings.

2. A metal reinforced trim panel, consisting of a body provided with openings adjacent an edge thereof, a metal reinforcement secured to said edge and including an unperforated skirt portion extending partially over said openings so that the heads of spring fasteners may be positioned in said openings and engaged on said skirt portion through the uncovered part of said openings.

BION C. PLACE.